Patented Aug. 10, 1943

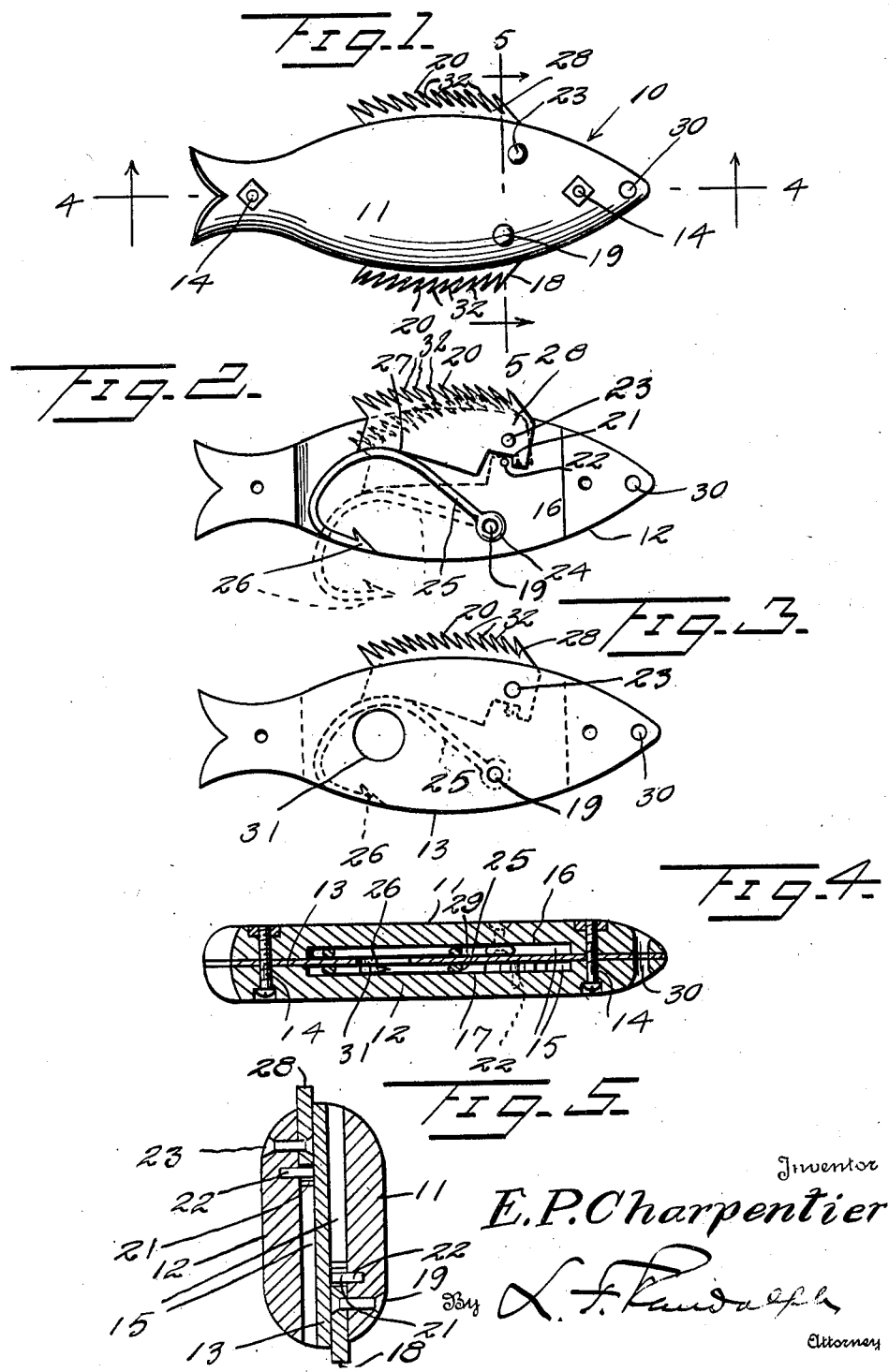

2,326,620

UNITED STATES PATENT OFFICE 2,326,620

AUTOMATIC FISHHOOK LURE

Edouard P. Charpentier, San Pedro, Calif., assignor of forty-five per cent to W. J. Gillis and ten per cent to John W. Baker, both of Los Angeles County, Calif.

Application March 28, 1941, Serial No. 385,711

4 Claims. (Cl. 43—35)

My invention relates to improvements on fish lures and has for its principal object the provision of means for insuring the catch of a fish by providing a pair of movable fins in the body of the fish lure actuating two concealed fish hooks from the body of the lure when the fish strikes, so that the hooks will be projected thereby from the lure body to engage the fish to insure the catch.

Other objects and advantages of the invention will hereinafter become more fully apparent from the following description of the drawing, which illustrates a preferred embodiment thereof, and wherein Figure 1 is a side elevational view of the fish lure, Figure 2 is an elevational view looking toward the inner side of one of the outer sections of the lure body, Figure 3 is a view similar to Figure 2, looking toward the intermediate section and showing the opposite outer section in dotted line behind the intermediate section, Figure 4 is a longitudinal sectional view taken substantially along the plane of the line 4—4 of Figure 1, and Figure 5 is a cross sectional view taken substantially along the plane of the line 5—5 of Figure 1.

Referring more particularly to the drawing, wherein like reference characters designate like or corresponding parts throughout the different views, 10 designates generally the lure in its entirety which includes the lure body shaped to simulate a minnow or other live bait fish and which is composed of outer sections 11 and 12 and an intermediate section 13. Sections 11, 12 and 13 are substantially the same shape in outline and the section 13 is disposed between the sections 11 and 12 and in abutting engagement with the inner sides thereof, as best seen in Figures 4 and 5. Sections 11, 12 and 13 are detachably fastened together adjacent their ends by nut and bolt fastenings 14 which are counter sunk in the outer sides of the sections 11 and 12. The inner sides of the sections 11 and 12 are provided with corresponding recesses 15 which extend lengthwise of the lure 10 to adjacent the ends thereof and which open outwardly of the top and bottom of the lure body, as best seen in Figure 5. Said recesses 15 form inner side or space portion 16 and 17 of the body sections 11 and 12, respectively, which are spaced from the intermediate section 13.

In the space 15, between the sections 12 and 13, there is disposed an elongated fin member 28 which is pivotally connected into the section 12, nearest the forward end, by means of a pivot pin or rivet 23. The outer, longitudinal edge 20 normally projects outwardly from the top of the lure 10. The opposite, inner edge of the fin member 28 is provided with a cut out portion 21 nearest the forward end into which projects a pin 22 which is anchored in the section 12 and which is disposed to engage portions of the fin member 28 to limit the swinging movement thereof.

Below and slightly to the rear of the pivot 23 the pivot pin or rivet 19 extends through the section 11 and loosely engages an eye 24 formed on the shank end of a fish hook 25 which is disposed in the recess 15 of the section 11. Hook 25 extends rearwardly from the pivot 19 and is turned downwardly and has a barbed end 26 which is normally disposed within the recess 15 of section 11 adjacent the bottom thereof. The inner longitudinal edge of the fin member 28, adjacent its rear, free end, is provided with an inwardly bowed portion 27 into which curved portion a fish hook shank normally bears.

The fin member 18 which corresponds to the fin member 28 is mounted in the recess 15 of section 11 in the same manner as said member 28 is mounted in the recess of section 12 but in an inverted position adjacent the bottom of the lure 10 so that its outer edge 20 projects outwardly from the bottom of the lure body. A fish hook 29 is mounted in the recess 15 of the section 11 in the same manner as the fish hook 25 is mounted in the recess of section 12 except that it is disposed above the fin member 18 with its barbed end extending upwardly and disposed to be projected outwardly through the top of the body 10, as will hereinafter be explained. Fin members 18 and 28 are normally held in their operative positions of Figures 1 to 3 by frictional engagement with the sections 11 and 12, respectively, and the section 13. Fish hooks 29 and 25 are normally held in inoperative, nested positions within the lure body by frictional engagement with the sections 11 and 12, respectively, and the section 13, as seen in full lines of Figure 2 and dotted lines of Figure 3.

The lure 10 is provided adjacent its forward end with an eye or opening 30 to which is adapted to be connected to the end of a fish line, not shown. When the lure is being drawn through the water and is struck by a fish, not shown, the mouth of the fish will engage the fin members 18 and 28 and cut them inwardly of the recesses 15 and thereby project the barbed end of the hook outwardly through the bottom of the lure 10 and the barbed end of the fish hook 29 outwardly to the top of the lure 10 to effectively hook the fish. After the lure 10 has been removed from the mouth of the fish, the barbed ends of the hooks are pressed back to their nested positions within the lure body and thereby project the fin members 18 and 28 outwardly and to their operative positions of Figure 1, to return the parts to a position ready to be used.

Obviously, the lure 10 may be made in any desired size and shape and may be formed of any suitable material and produced in any color or color combination adapted for attracting fish. Furthermore, intermediate section 13 is provided with an opening 31 for the purpose of retaining within the lure 10 a cake of any scented composition which is attractive to fish, such as assafoetida for further increasing the attractiveness of the lure to the fish.

The outer edges 20 of the fin members 18 and 28 are provided with sharp teeth 32 which are inclined away from the forward end of the lure 10 and which are sharpened on their forward or outer edges to enable the lure to readily cut through the seaweed or other undergrowth and to prevent the lure from becoming entangled therein.

Various other modifications and changes are contemplated and may obviously be resorted to, provided they fall within the spirit and scope of the invention as hereinafter defined by the appended claims, as only a preferred embodiment of the invention has been disclosed.

I claim:

1. A fishing lure comprising a body formed of outer plates and an inner plate, means for connecting the plates in spaced, side by side relationship, a hook pivotally connected at its shank end to each of the outer plates, said hooks extending rearwardly of the body from their pivoted ends and being normally disposed between the outer plates and the inner plate, one of the hooks being arranged to swing outwardly through the top of the body and the other hook being arranged to swing outwardly through the bottom thereof, said hooks being normally held by friction in nested positions between the plates, a fin member pivotally connected to each of the outer plates at its forward end, said fin members being disposed in the spaces between the outer plates and the inner plate, the inner, longitudinal edges of the fin members being disposed to engage the hooks, and said fin members, when the hooks are in nested positions, having their outer edges protruding from the lure body so that the fin members can be pressed inwardly of the body to project the hooks.

2. A fishing lure as in claim 1, the outer edges of the fin members being saw-toothed for cutting through seaweed and the like to prevent the lure from becoming entangled therein.

3. A fish lure comprising a lure body having a perpendicularly disposed longitudinally extending recess which opens outwardly of the top and bottom of the body, hooks disposed in the recess, said hooks each being pivotally connected at its shank end to a side of the lure body and said hooks extending rearwardly from their pivoted ends, the barbed ends of the hooks extending toward the top and bottom of the lure body from the shanks of the hooks, fin members disposed in the recess and pivotally connected at corresponding ends thereof to the sides of the body, said fin members having portions protruding from the body and portions for engaging the hooks, when the hooks are in nested positions, and said fin members being adapted to be swung inwardly of the lure body to project the barbed ends of the hooks through the top and bottom thereof.

4. A fish lure as in claim 3, and a spacing strip extending longitudinally through the recess and disposed between the hooks and between the fin members.

EDOUARD P. CHARPENTIER.